(12) United States Patent
Rice et al.

(10) Patent No.: US 7,000,306 B2
(45) Date of Patent: Feb. 21, 2006

(54) SPUN METAL FORM USED TO MANUFACTURE DUAL ALLOY TURBINE WHEEL

(75) Inventors: Derek A. Rice, Phoenix, AZ (US); Venkatesh S. Krishnan, Mesa, AZ (US); David R. Waldman, Chandler, AZ (US); Gary G. Capek, Laveen, AZ (US); Devinder N. Katariya, Chandler, AZ (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/919,833

(22) Filed: Aug. 16, 2004

(65) Prior Publication Data

US 2005/0011070 A1    Jan. 20, 2005

Related U.S. Application Data

(62) Division of application No. 10/323,156, filed on Dec. 18, 2002, now Pat. No. 6,935,006.

(51) Int. Cl.
*B23Q 7/00* (2006.01)

(52) U.S. Cl. .................. 29/559; 29/281.1

(58) Field of Classification Search .................. 29/559, 29/28.1, 889.1, 458, 49.1, 428, 281.3
See application file for complete search history.

(56) References Cited

U.S. PATENT DOCUMENTS

| | | | |
|---|---|---|---|
| 3,815,219 A | 6/1974 | Wilson | |
| 3,928,901 A | 12/1975 | Schilling | |
| 3,952,939 A | 4/1976 | Schilling et al. | |
| 4,096,615 A | 6/1978 | Cross | |
| 4,152,816 A | 5/1979 | Ewing et al. | |
| 4,581,300 A | 4/1986 | Hoppin, III et al. | |
| 4,603,801 A | 8/1986 | Wan et al. | |
| 4,796,343 A | 1/1989 | Wing | |
| 5,113,583 A | 5/1992 | Jenkel et al. | |
| 5,593,085 A | 1/1997 | Tohill et al. | |
| 6,935,006 B1 * | 8/2005 | Rice et al. ................. | 29/281.1 |

* cited by examiner

*Primary Examiner*—Lee D. Wilson
(74) *Attorney, Agent, or Firm*—Ingrassia Fisher & Lorenz

(57) ABSTRACT

A spun metal form used to manufacture a dual alloy turbine wheel. The spun metal form prevents braze alloy contamination of the hub/casting interface by relocating the braze joint away from the interface. The spun metal form allows for the re-working of components after failed vacuum brazing and increases the time to failure of dual alloy turbine wheels.

34 Claims, 8 Drawing Sheets

SPUN METAL FORM USED TO MANUFACTURE DUAL ALLOY TURBINE WHEEL

CROSS-REFERENCE TO RELATED APPLICATIONS

This is a divisional application of U.S. application Ser. No. 10/323,156, filed on Dec. 18, 2002, now U.S. Pat. No. 6,935,006.

BACKGROUND OF THE INVENTION

The present invention generally relates to dual alloy turbine wheels and, more particularly, to spun metal forms used to manufacture dual alloy turbine wheels.

Turbine wheels comprising two distinct alloys have been used extensively in gas turbine engines. Dual alloy wheels have been used to address the need for hubs and castings having different material properties. Dual alloys have been used to provide turbine wheel hubs having one set of material properties and turbine wheel castings having another set of material properties. Turbine wheel hubs have been formed from alloys that have high tensile strength and low cycle fatigue resistance. Turbine wheel castings, which are exposed to the higher temperatures of the gas path and higher centrifugal loads, have been formed from alloys that have high stress rupture and creep resistance. The two dissimilar alloy parts have been joined by hot isostatic pressing to form dual alloy turbine wheels.

Hot isostatic pressing (HIP) utilizes an autoclave and a pressure transfer medium, such as inert argon gas, to facilitate diffusion bonding of the two dissimilar metals. Vacuum sealing the interface between the casting and the hub is necessary for acceptable diffusion bond formation. Metal or ceramic shaped containers have been used to completely enclose and vacuum seal the dual alloy components during HIP. Unfortunately, these methods are unsuitable for some applications due to container leakage and geometric limitations.

Other methods for producing dual alloy turbine wheels by HIP have been disclosed in U.S. Pat. No. 4,581,300. In this method, the casting and hub are assembled. A sealing plate is then electron-beam welded and vacuum brazed to the casting. Although this method may be used to vacuum seal the interface, braze alloy contamination of the interface is common. Braze alloy contamination in the structural region of the part is unacceptable in some applications and results in poor field performance. Using these methods, scrap due to braze alloy contamination has been reported to be about 20% and the associated manufacturing cost to be about $500,000/year.

Another HIP method is described in U.S. Pat. No. 4,603,801. In this method, the pressure transferring medium comprises a granular glass medium. The interface is isolated from the pressure transferring medium by a stainless steel interference fit seam isolator. Although braze alloy contamination of the dual alloy interface may be prevented by using these methods, the disclosed processes are not useful for many applications.

Another method for preventing braze alloy contamination is disclosed in U.S. Pat. No. 4,796,343. In this method, annular braze traps are used to prevent braze contamination of the interface. Braze trap formation requires machining of the hub and casting. Unfortunately, the machining necessary to form the braze traps is expensive and exacting. Because the casting is brazed to the hub, the re-working of leaking assemblies is not possible and further increases production costs.

An expendable spun metal form capable of preventing braze alloy contamination is needed. Also, there is a need for improved methods of preventing braze alloy contamination of a dual alloy interface. A method is needed wherein braze trap machining is not necessary. Moreover, there is a need for a method wherein the hub and the casting of a leaking assembly can be re-worked.

SUMMARY OF THE INVENTION

In one aspect of the present invention, an apparatus used to manufacture a dual alloy object comprises a formed can. The formed can flange is vacuum brazed to the dual alloy casting flange. By locating the braze interface away from the casting hub interface, braze alloy contamination is prevented.

In another aspect of the present invention, an apparatus used to position a braze bead on a dual alloy assembly comprises a form can; and an annular form flange extending radially out from and integral to the form can, the annular form flange having a flange edge, the dual alloy assembly having an interface edge, and the apparatus capable of being in contact with the dual alloy assembly such that the form can is in contact with the interface edge and such that a distance between the flange edge and interface edge is about 0.090 inches.

In yet another aspect of the present invention, an apparatus used to manufacture a dual alloy turbine wheel comprises a form can; and an annular form flange extending radially out from and integral to the form can, the annular form flange comprising a nickel-based superalloy, the dual alloy turbine wheel having an interface and a casting flange, the apparatus capable of being in contact with the dual alloy turbine wheel such that the form can is in contact with an edge of the interface and such that the annular form flange is in contact with the casting flange, and the apparatus capable of preventing braze alloy contamination of the interface.

In a further aspect of the present invention, a method of manufacturing a dual alloy turbine wheel comprises the steps of providing a casting, a hub, and a spun metal form, the casting having a casting flange, the spun metal form having a form flange; assembling the casting, the hub, and the spun metal form such that an assembly is produced; applying a braze bead to the assembly such that the braze bead is in contact with the casting flange and the form flange; vacuum brazing the assembly; and hot isostatic pressing the assembly.

These and other features, aspects, and advantages of the present invention will become better understood with reference to the following drawings, description, and claims.

BRIEF DESCRIPTION OF THE DRAWINGS

FIG. 3b is a sectional view through B—B in FIG. 3a;

FIG. 3c is an inverted perspective view of the spun metal form of FIG. 3a;

DETAILED DESCRIPTION OF THE INVENTION

Figure 1:
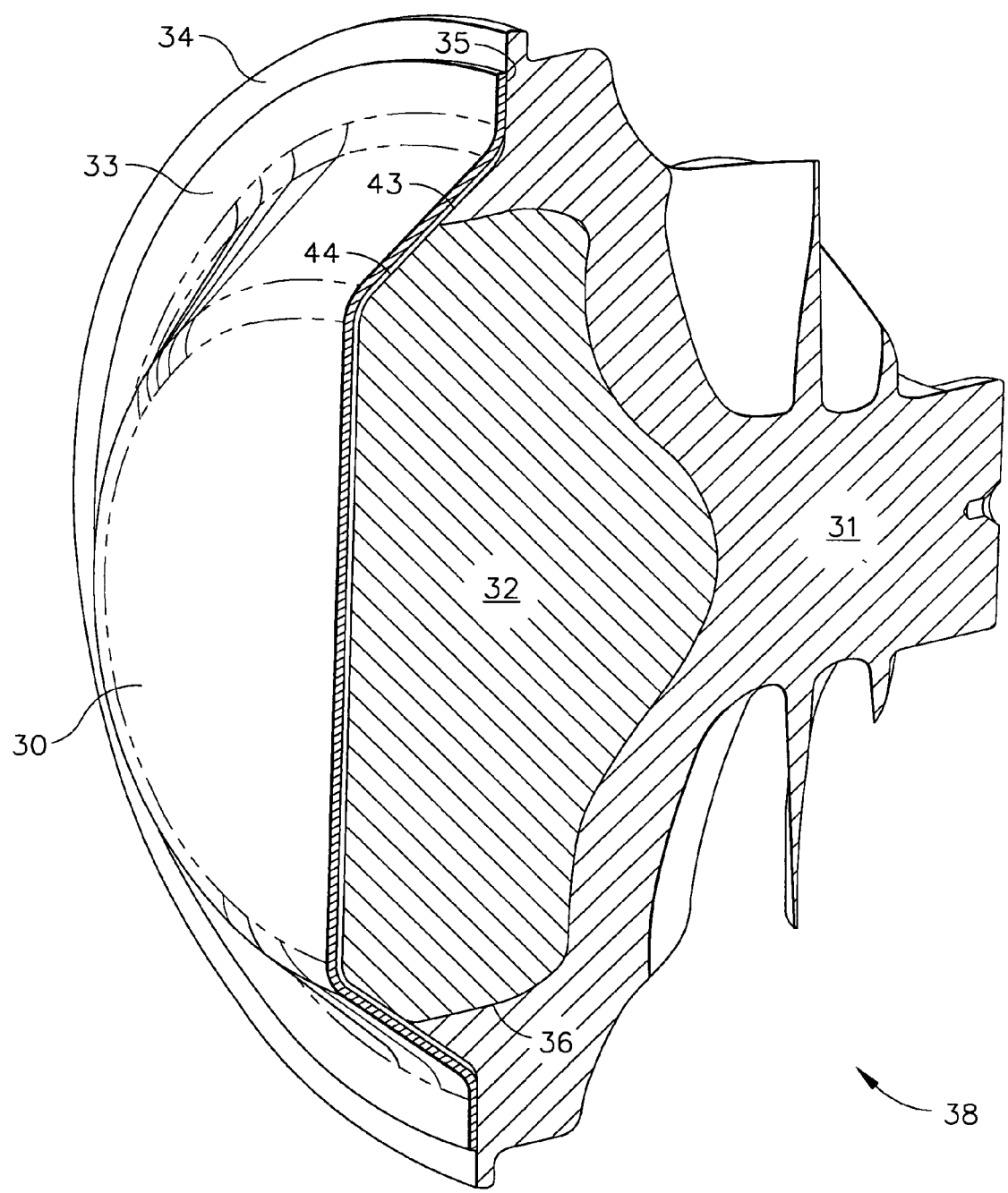
FIG. 1 is a perspective view of a sectioned dual alloy turbine wheel assembly according to one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention generally provides spun metal forms used to manufacture dual alloy turbine wheels and methods for producing the same. The spun metal forms produced according to the present invention may find beneficial use in many industries including aerospace, automotive, and power plant operations. The present invention may be beneficial in applications including commercial and military auxiliary power units (APU), aircraft propulsion, naval propulsion, pumping sets for gas and oil transmission, and electricity generation. The present invention may be useful with any gas turbine engine having a dual alloy turbine wheel.

In one embodiment, the present invention provides a spun metal form 30 used to manufacture a dual alloy turbine wheel. Dual alloy turbine wheels may be formed by the diffusion bonding of a casting 31 to a hub 32. A HIP process may be utilized to facilitate the diffusion bonding. Prior to HIP processing, the spun metal form 30 of the present invention may be assembled together with the casting 31 and the hub 32. The spun metal form 30 may be brazed to the casting 31 and may be capable of creating a vacuum at the future casting/hub interface 36. Unlike the prior art, the present invention may relocate the braze alloy 42 away from the casting/hub interface 36. The spun metal form 30 may prevent braze alloy contamination of the interface between the casting 31 and the hub 32. Further, unlike the prior art the present invention may allow for the re-working of defective parts after a braze thermal cycle.

Referring now to FIG. 1, a spun metal form 30 of the present invention may be assembled together with a casting 31 and a hub 32. The spun metal form 30 may have a form flange 33 and a form can 39, as better seen in FIGS. 3a–3d. The casting 31 may have a casting flange 34. The form flange 33 may be vacuum brazed to the casting flange 34 at a braze joint 35. Because the end of form flange 33 that is brazed may be about 0.090 inches away from the edge 48 of hub/casting interface 36, braze alloy contamination of hub/casting interface 36 may be prevented.

Figure 2:
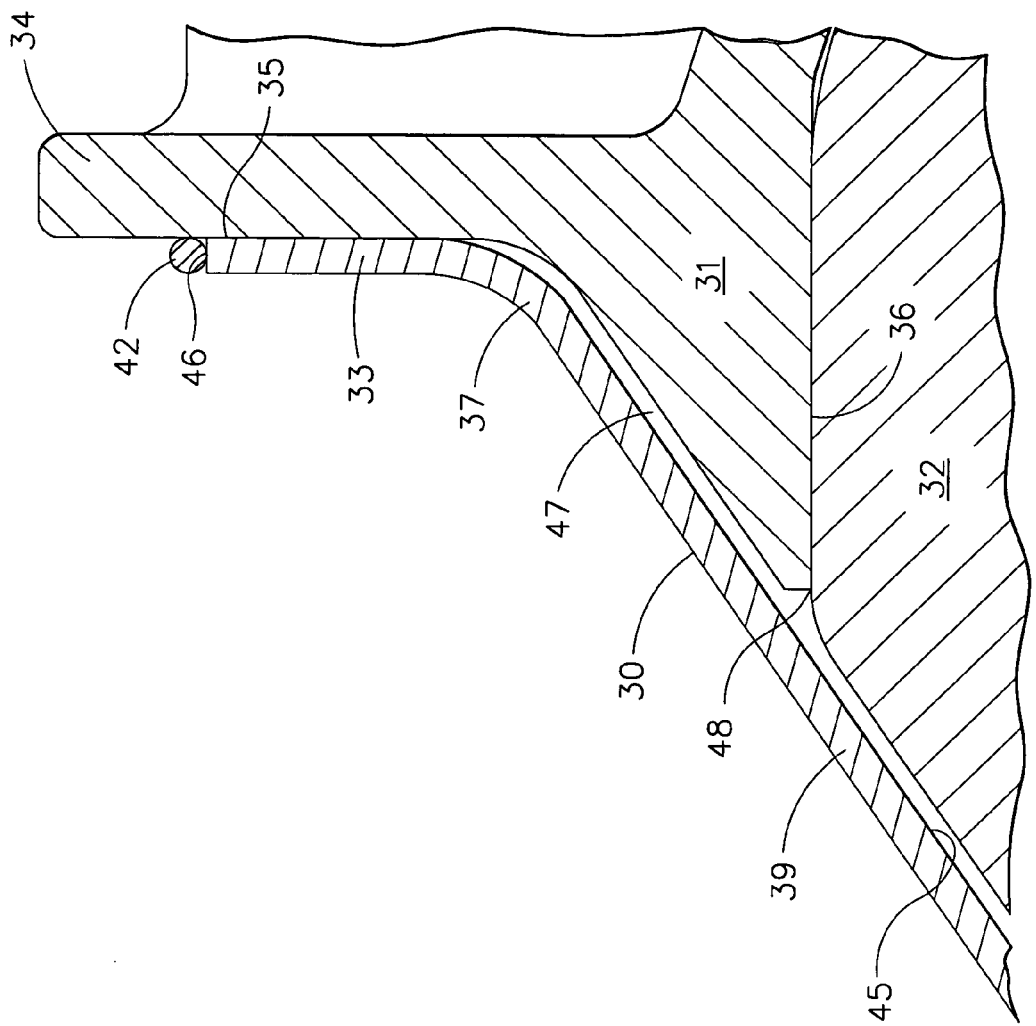
FIG. 2 is a partial cross-section of a dual alloy turbine wheel assembly according to one embodiment of the present invention.
Figure 3A:
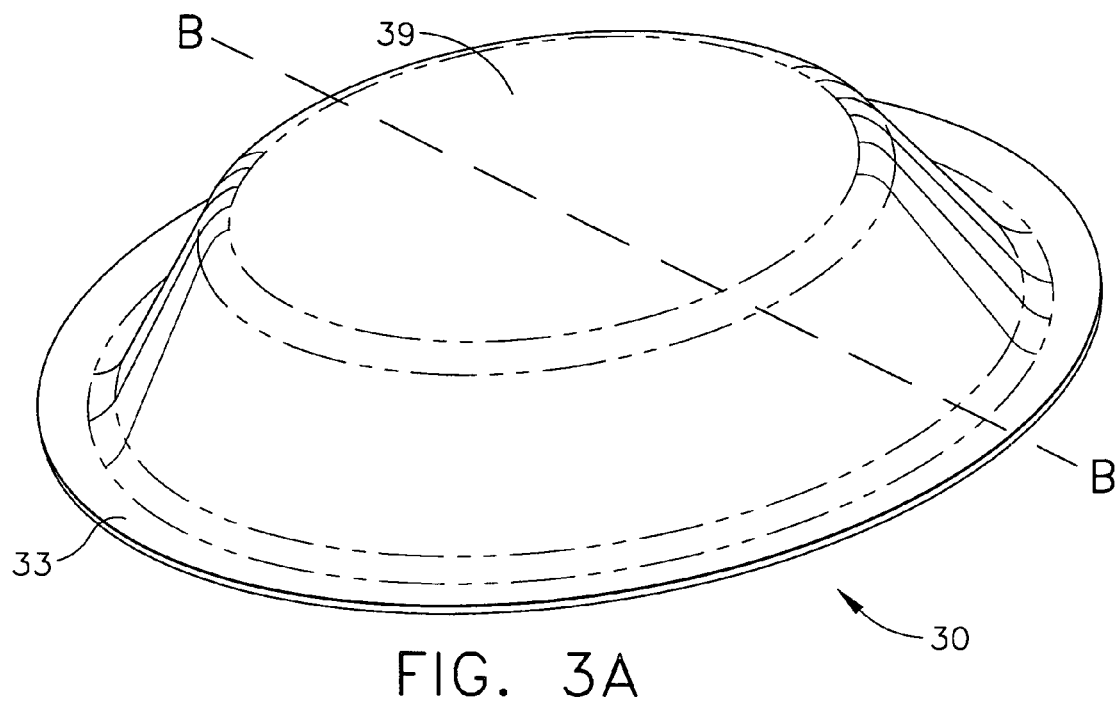
FIG. 3a is a perspective view of a spun metal form according to an embodiment of the present invention.
Figure 3B:
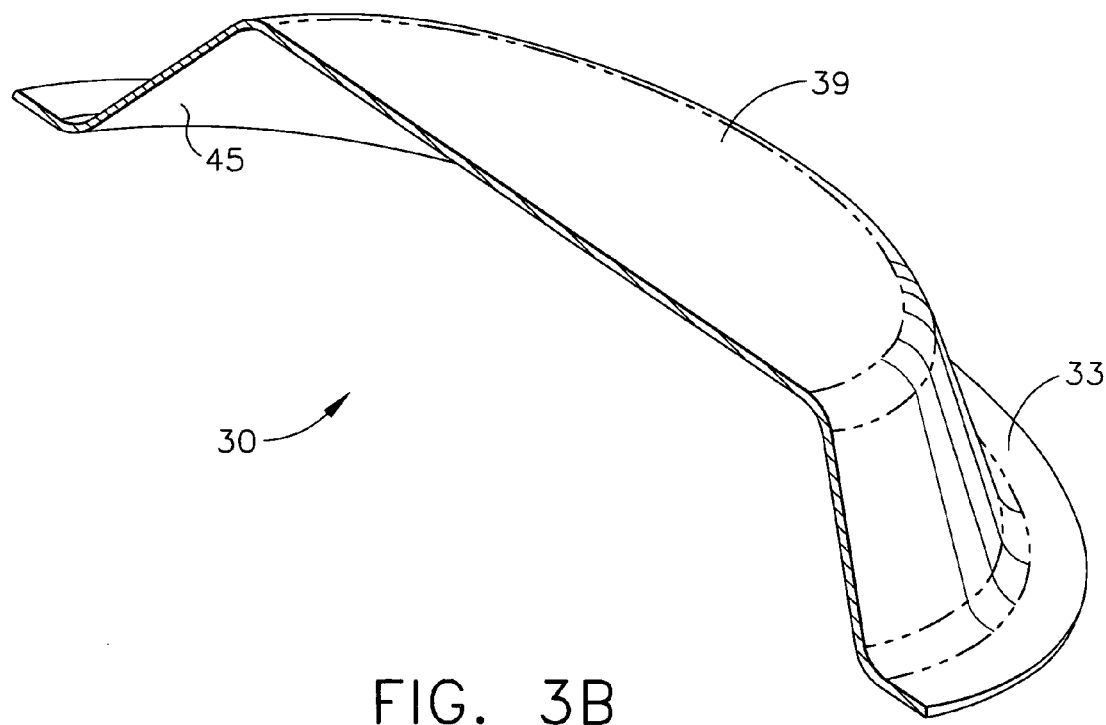
Figure 3C:
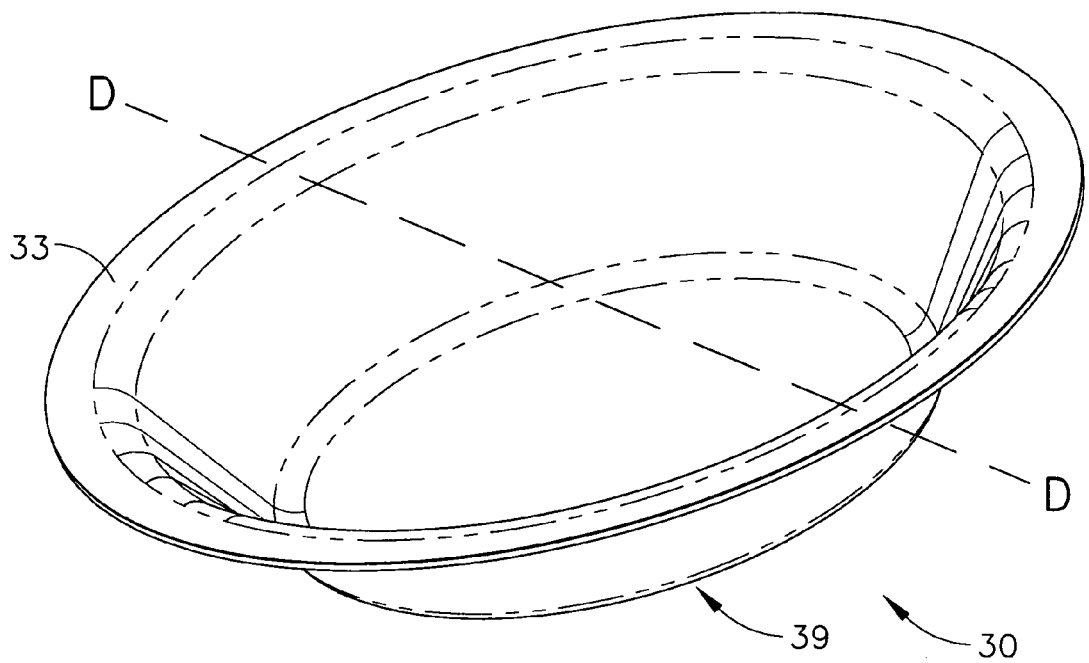
Figure 3D:
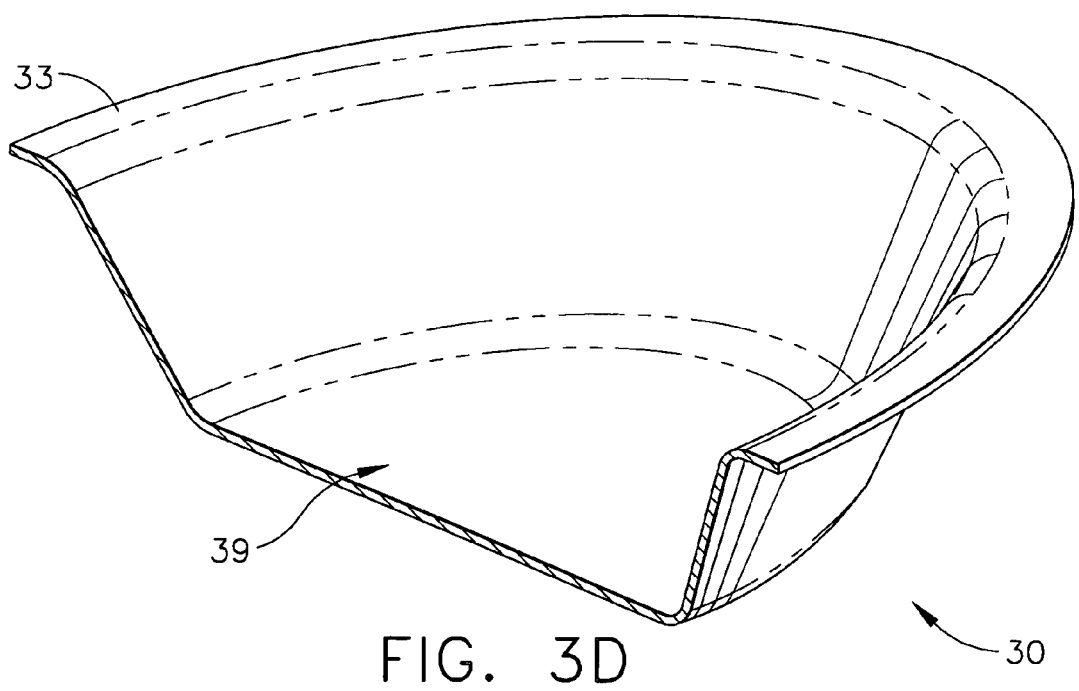
FIG. 3d is a sectional view through D—D in FIG. 3c.

The braze alloy 42 may be positioned at the flange edge 46, as best seen in FIG. 2. The flange edge 46 may be the outer diameter (rim) of the spun metal form 30. Because spun metal form 30 may conform to the shape of hub 32 and the portion of the casting 31 that it covers, the braze alloy 42 may wick into the form gap 47 during vacuum brazing. The form gap 47 may be the gap between the spun metal form 30 and the casting 31. The distance between the flange edge 46 and the interface edge 48 may be sufficient to prevent the braze alloy 42 from wicking into the hub/casting interface 36. The interface edge 48 may be the outer diameter (rim) of the hub/casting interface 36. The distance between the flange edge 46 and the interface edge 48 may vary and may depend on factors including the composition of the braze alloy 42 and the thickness of the form gap 47. The distance between the flange edge 46 and the interface edge 48 may be measured through the form gap 47. The distance between the flange edge 46 and the interface edge 48 may be greater than the length of a straight line between the flange edge 46 and the interface edge 48. In prior art methods, braze alloy 42 wicks into the hub/casting interface 36 through the interface edge 48. The can/flange angle 37 may also contribute to the prevention of braze alloy contamination. The can/flange angle 37, as shown in FIG. 2, may be the area of the spun metal form 30 where the form flange 33 meets the form can 39. In prior art methods, the braze joint 35 is located at the hub/casting interface 36 and braze alloy contamination of the hub/casting interface 36 is common. In prior art methods, the braze alloy is wicked into the hub/casting interface during vacuum braze processes.

A spun metal form 30 of the present invention is depicted in FIGS. 3a–3d. The spun metal form 30 may comprise a form flange 33 and a form can 39. The form flange 33 may be integral to the form can 39. The form flange 33 may be annular and may be perpendicular to an axis through the spun metal form 30. The form flange 33 may extend radially out from the form can 39. The form flange 33 and the form can 39 may be manufactured together by known methods. Useful methods for manufacturing a spun metal form 30 may include known spinning methods.

Figure 4:
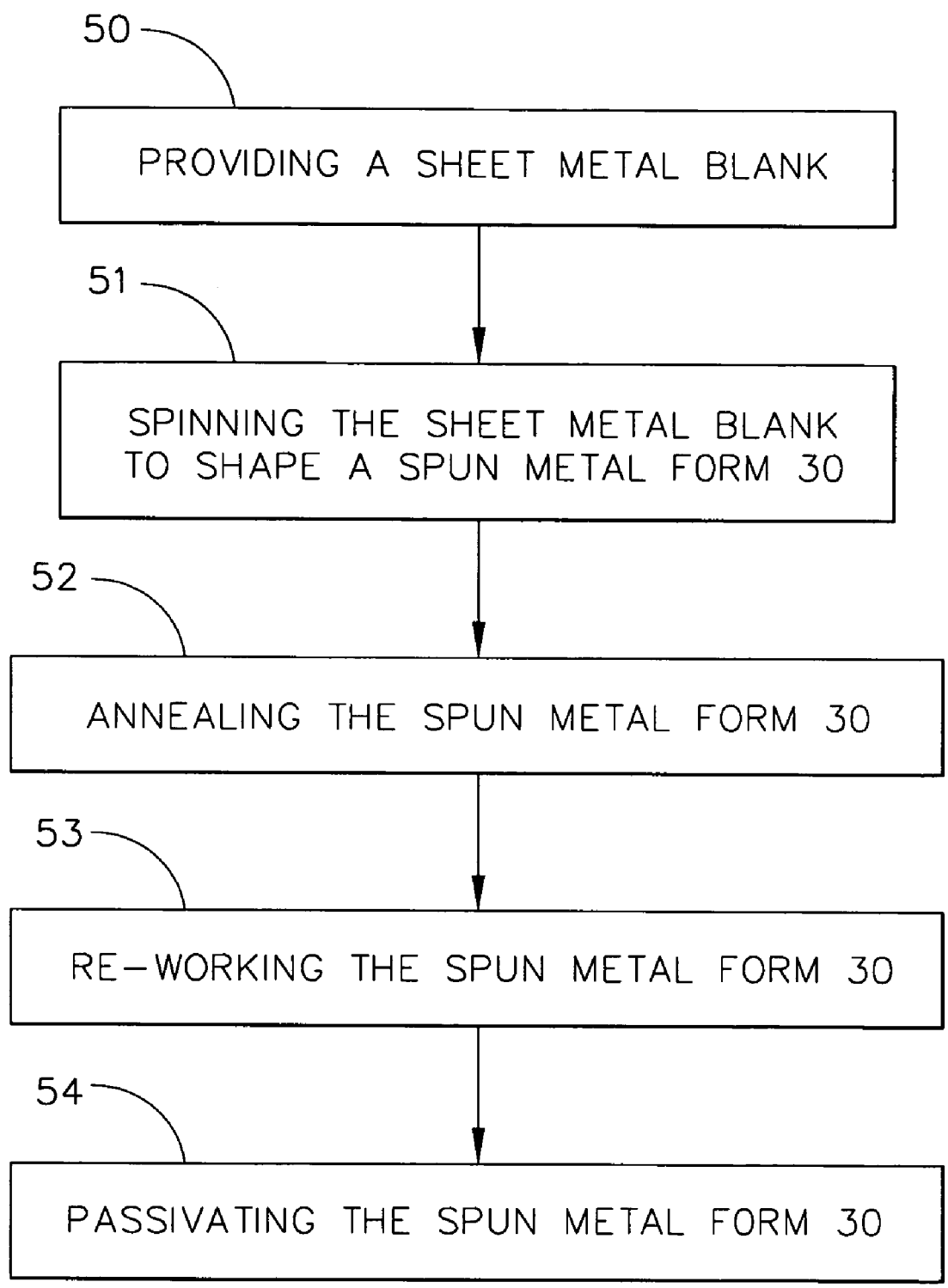
FIG. 4 is a flow chart depicting the steps of producing a spun metal form according to one embodiment of the present invention.

The steps of producing a spun metal form 30 are depicted in FIG. 4. The process may include a step 50 of providing a sheet metal blank, a step 51 of spinning the sheet metal blank to shape a spun metal form 30, a step 52 of annealing the spun metal form 30, a step 53 of re-working the spun metal form 30, and a step 54 of passivating the spun metal form 30.

The sheet metal blank of step 50 may comprise a metal alloy sheet. Useful metal alloys may include nickel-based superalloys. Preferred metal alloys may include INCO 600 series, IN625, and Hast-X. The dimensions of a useful metal alloy sheet may depend on the desired dimensions of the spun metal form 30. A useful thickness of the metal alloy sheet may vary depending on the composition of the metal alloy and the desired application. The thickness of useful metal alloy sheets may be between about 0.032 inches and about 0.100 inches.

The step 51 of spinning the sheet metal blank may utilize known spinning techniques. Spinning processes are known in the art and have been used to produce a variety of products possessing rotational symmetry. Known spinning may comprise clamping a sheet metal blank between a mandrel and a friction block (pad). The sheet metal blank may then be forced over the mandrel by means of a spinning tool. The sheet metal blank and clamping members may be rotated while the spinning tool is moved on a horizontal plane on a level with the center of rotation. The force transmitted to the sheet metal blank may be partially compressive and partly flexural in effect. The compressive component may be controlled to avoid thinning the metal locally. Some sheet metal blanks may be prone to work hardening during deformation and may require several intermediate stages of shaping and annealing, as is known in the art. The sheet metal blank may be spun by hand or by an automatic spinning lathe.

The step 51 may produce a spun metal form 30 that may be near net shape. The geometry of the spun metal form 30 may vary and may depend on the geometry of the casting 31 and the geometry of the hub 32. Although the dimensions of the spun metal form 30 may vary, a useful spun metal form 30 may have dimensions such that the form flange 33 is capable of being vacuum brazed to the casting flange 34. The form flange 33 may be capable of being brazed to the casting flange 34 at a braze joint 35, such that the braze joint 35 is positioned away from the hub/casting interface 36. A useful form can 39 may be capable of covering the hub/casting interface 36. A useful spun metal form 30 may be capable of vacuum sealing the hub/casting interface 36. When the form flange 33 and the casting flange 34 are vacuum brazed, the hub/casting interface 36 may be sealed. The thickness of a useful spun metal form 30 may depend on the composition of the sheet metal blank and the desired application. For example, when the sheet metal blank comprises IN625 and the spun metal form 30 is used to manufacture a radial dual alloy turbine wheel, a useful thickness of the spun metal form 30 may be between about 0.032 inches and about 0.093 inches. The shape of a useful spun metal form 30 may vary and may be complimentary to the shape of the casting 31 and hub 32. As shown in FIG. 2, the spun metal form 30 may have an inner surface 45 that follows the contours of an assembled casting 31 and hub 32.

The step 52 of annealing the spun metal form 30 may comprise known annealing processes. The step 52 of annealing may comprise solution annealing. The spun metal form 30 may be annealed by heating in a vacuum furnace. The temperature and time of heating may vary and may depend on the composition of the spun metal form 30. For example, when the spun metal form 30 comprises IN625, the step 52 of annealing may comprise heating the spun metal form 30 to about 2100° F. for about one hour.

After annealing, the spun metal form 30 may be re-worked. The step 53 of re-working may comprise machining the form flange 33. The form flange 33 may be stamped flat by known methods. The form flange 33 may be flat to within about 0.002 inches as interpreted per ASME Y14.5M. After re-working, the form flange 33 may be planar such that the form flange 33 may be capable of being positioned flush with the casting flange 34. The form flange 33 may be machined to remove any sharp edges that may cause injury to personnel. Burrs on the form flange 33, which may interfere with the vacuum brazing of the form flange 33 to the casting flange 34, may be removed by known machining methods. The form flange 33 may be re-worked such that it is capable of being vacuum-brazed to the casting flange 34.

The steps of producing a spun metal form 30, as depicted in FIG. 4, may include a step 54 of passivating the spun metal form 30 using standard wet chemical techniques. After the step 54 of passivating, the spun metal form 30 may be used to manufacture a dual alloy object, such as a turbine wheel.

Figure 5:
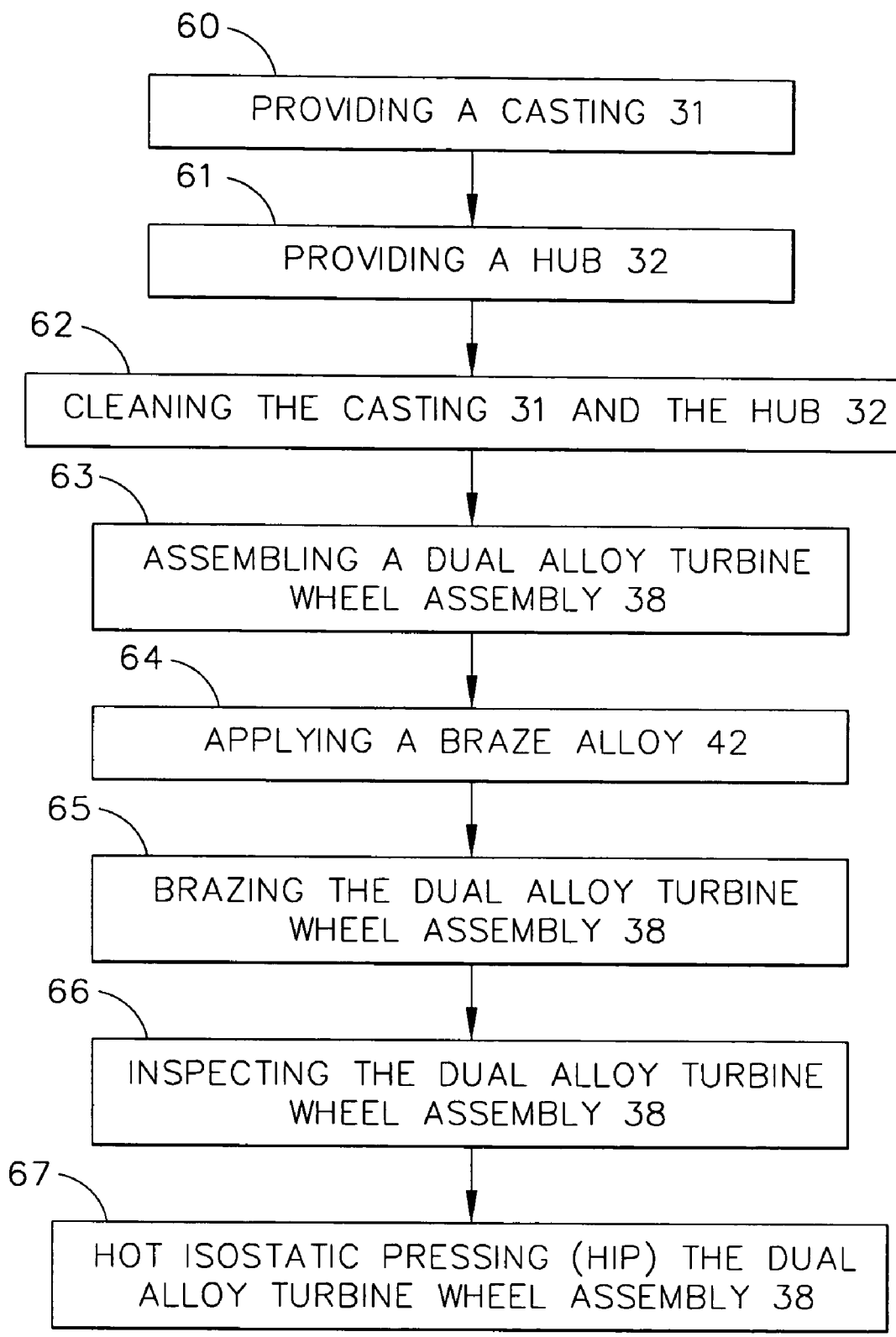
FIG. 5 is a flow chart depicting the steps of manufacturing a dual alloy turbine wheel according to one embodiment of the present invention.

The steps of manufacturing a dual alloy turbine wheel are depicted in FIG. 5. The process may include a step 60 of providing a casting 31; a step 61 of providing a hub 32; a step 62 of cleaning the casting 31 and the hub 32; a step 63 of assembling a dual alloy turbine wheel assembly 38; a step 64 of applying a braze alloy 42; a step 65 of brazing the dual alloy turbine wheel assembly 38; a step 66 of inspecting the dual alloy turbine wheel assembly 38; and a step 67 of hot isostatic pressing (HIP) the dual alloy turbine wheel assembly 38.

The casting 31 of step 60 may comprise any known metal alloy and may have a casting chamfer 43 and a casting flange 34. The casting 31 may comprise an alloy having high creep resistance. Useful metal alloys may include Mar-M-247, INCO 713LC, IN100, IN792, and IN738. The casting chamfer 43, as seen in FIG. 1, may be formed by known machining methods. Machining about 0.125 inches from the casting 31 may form the casting chamfer 43. The casting chamfer 43 may be used to position the spun metal form 30 during the step 63 of assembling.

The hub 32 of step 61 may comprise any known metal alloy and may have a hub chamfer 44. The hub 32 may comprise an alloy having high tensile strength. Useful metal alloys may include but are not limited to U720, Astrology PM, or Rene 95. The hub chamfer 44, as seen in FIG. 1, may be formed by known machining methods. Machining about 0.125 inches from the hub 32 may form the hub chamfer 44. The hub chamfer 44 may be used to position the spun metal form 30 during the step 63 of assembling.

The step 62 of cleaning the casting 31 and the hub 32 may comprise any known chemical cleaning methods. After cleaning, the casting 31 and the hub 32 may be assembled together with a spun metal form 30.

The step 63 of assembling a dual alloy turbine wheel assembly 38 may comprise positioning the casting 31 in contact with the hub 32. A spun metal form 30 may then be positioned such that the form flange 33 may be flush with the casting flange 34 and such that the spun metal form 30 covers the hub/casting interface 36. The casting chamfer 43 and the hub chamfer 44 may be useful for positioning the spun metal form 30. The step 63 may occur after the step 44 of passivating the spun metal form 30. The step 63 may occur within about eight hours of the step 44 of passivating.

The step 64 of applying a braze alloy 42 may comprise applying a bead of braze alloy 42 to the form flange 33. The braze alloy 42 may be in contact with the form flange 33 and the casting flange 34. The diameter of a useful bead of braze alloy 42 may be such that the bead is capable of brazing the form flange 33 to the casting flange 34. The diameter of a useful bead may be such that the braze alloy 42 does not wick into the hub/casting interface 36. The diameter of the bead of braze alloy 42 may vary and may depend on the application. For example, when manufacturing a radial dual alloy turbine wheel, the diameter of the bead may be between about 0.075 inches and about 0.125 inches. Any known braze applying techniques and any known braze compositions may be useful with the present invention.

The step 65 of brazing may comprise vacuum brazing. The step 65 of brazing may vacuum seal the hub/casting interface 36. Brazing methods are known in the art, any of which may be useful with the present invention. After brazing, the process may comprise a step 66 of inspecting the dual alloy turbine wheel assembly 38.

The step 66 of inspecting the assembly 38 may comprise visual inspection. The spun metal form 30 may be deformable and may compress/crimp during the step 65 of brazing. The spun metal form 30 may appear concave after the step 65 because the brazing may hold a vacuum seal. A concave appearance of the spun metal form 30 may indicate that an acceptable vacuum seal has been produced. The concave appearance of the spun metal form 30 may be absent from an assembly having a braze leak. A braze leak may indicate a vacuum seal failure. Unlike prior art methods, the hub 32 and casting 31 may be re-worked when a braze leak is indicated. This may be because the hub 32 may not be contaminated by the braze alloy 42.

After the step 66 of inspecting indicates that an acceptable vacuum seal has been produced, the process may comprise a step 67 of hot isostatic pressing (HIP). Useful HIP methods may include the HIP methods described in U.S. Pat. No. 4,581,300, which is incorporated herein by reference. Any known HIP methods may be useful with the present invention. The HIP services of companies, such as Howmet of Whitehall, Mich., may be useful with the present invention. Useful HIP methods may comprise pressures of less than about 25,000 psi at 2,225° F. Strain on the assembly 38 at low temperatures may result in damage to the spun metal form 30 and diffusion bond failure due to vacuum seal leak. At higher HIP temperatures the spun metal form 30 may be less prone to damage from cold work. Useful HIP methods may also comprise ceramic HIP supports having rounded edges. Supports with rounded edges may prevent the spun metal forms 30 from being damaged by the supports during HIP.

Figure 6:
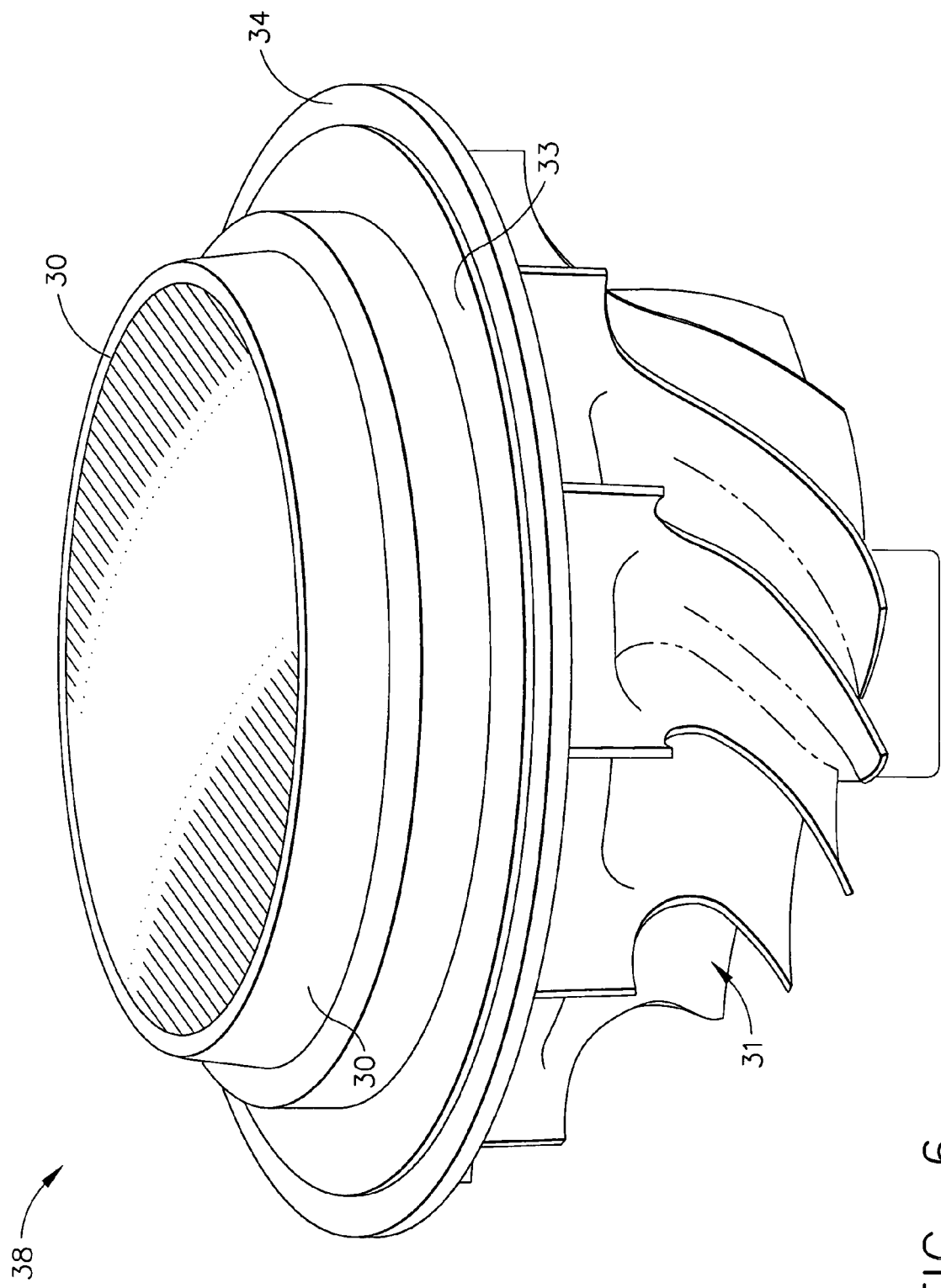
FIG. 6 is a perspective view of a dual alloy turbine wheel assembly after HIP processing according to one embodiment of the present invention.
Figure 7:
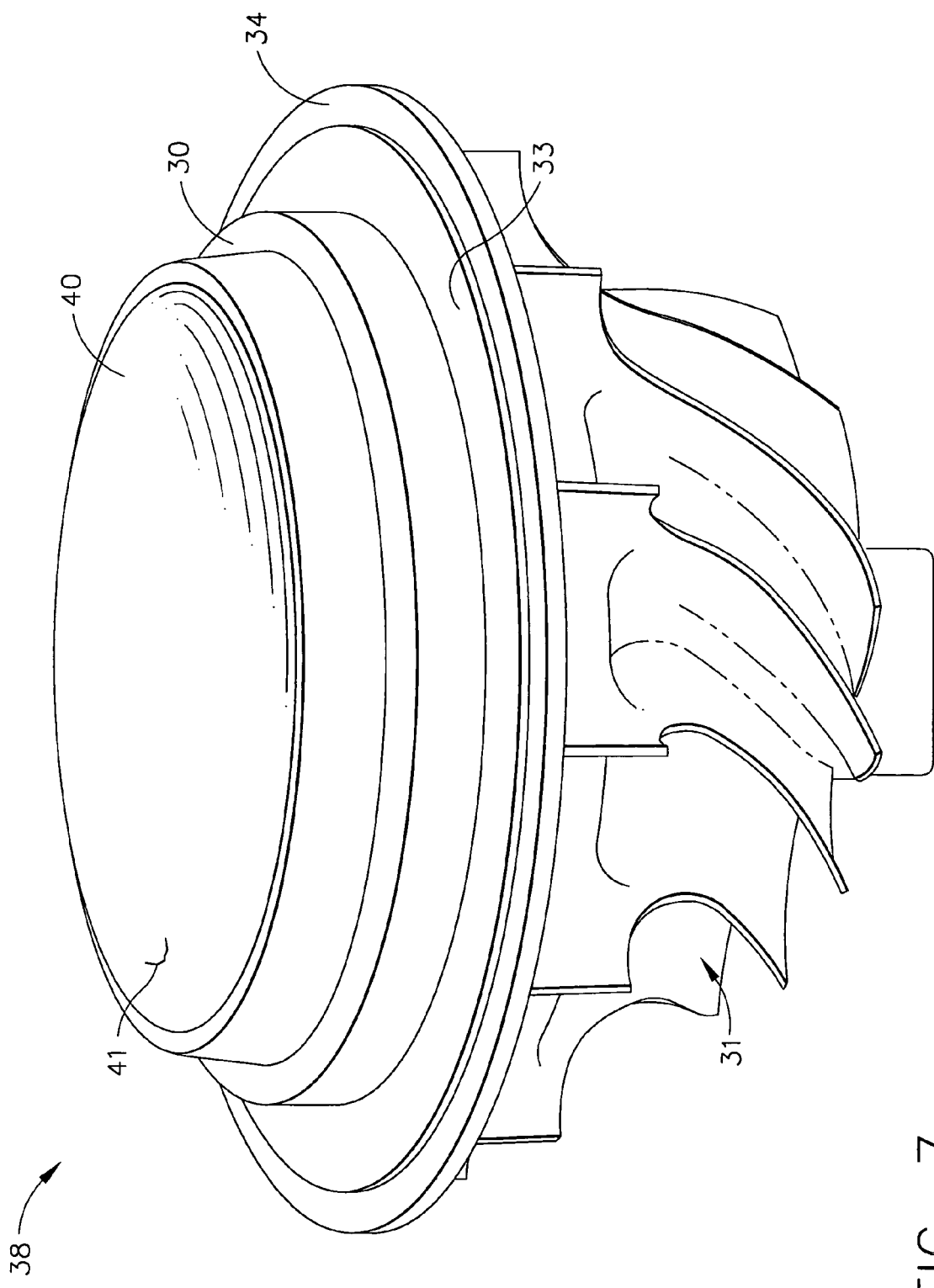
FIG. 7 is a perspective view of a dual alloy turbine wheel assembly after failed HIP processing according to an embodiment of the present invention.

As shown in FIG. 6, a dual alloy turbine wheel assembly 38 may appear free of cracks and bulges after HIP processing. This may indicate that the vacuum seal was maintained during HIP processing and that the assembly 38 may be acceptable. After HIP processing, a dual alloy turbine wheel assembly 38 may have a bulge 40 and a crack 41, as shown in FIG. 7. This may indicate vacuum seal failure during HIP processing and that the assembly 38 may be unacceptable. The bulge 40 may be due to vacuum loss caused by leakage during HIP. After the step 67 of HIP, the spun metal form 30 and the casting flange 34 may be removed by known machining methods.

EXAMPLE 1

Twelve dual alloy turbine wheels were manufactured according to the present invention. The spun metal forms 30 comprised IN625. The distance between the bead of braze alloy 42 and the interface edge 48 was 0.090 inches. The diameter of the bead was 0.075 inches. The castings 31 comprised Mar-M-247 and the hubs 32 comprised U720. The HIP processing was performed by Howmet-Whitehall. The dual alloy turbine wheels were then inspected for braze alloy contamination of the hub/casting interface 36. Microprobe analysis was used to examine boron levels at the hub/casting interface 36. Elevated boron levels were not detected. It was concluded that all twelve dual alloy turbine wheels were free of braze alloy contamination of the hub/casting interface.

EXAMPLE 2

Eight specimens from four current production dual alloy turbine wheels and eight specimens from four dual alloy turbine wheels made using the spun metal form 30 were creep rupture tested. The specimens were cylindrical creep rupture bars machined from the nose of the wheels. The bond interface was located at the center of the gauge length. The testing conditions were 62,000 psi at 1400° F. The mean time of failure for the current production specimens was 181.8 hours. The mean time of failure for the specimens made using the spun metal form was 218.3 hours. The 20% improvement in time to failure may be an additional advantage of the present invention. The improvement in time to failure may be the result of discrete carbide phase along bond interface. The current production specimens did not have the bond interface carbide. The reason the carbide was not present in the current production specimens was not determined.

As can be appreciated by those skilled in the art, the present invention provides a spun metal form 30 used to manufacture a dual alloy turbine wheel. Also provided is an expendable metal form that allows for re-working the casting 31 and the hub 32 of an assembly 38 having a braze leak. Moreover, a metal form is provided that is capable of vacuum sealing the hub/casting interface 36 and capable of preventing braze alloy contamination of the hub/casting interface 36. Further, spun metal forms 30 capable of increasing time to failure of dual alloy turbine wheels are provided.

It should be understood, of course, that the foregoing relates to preferred embodiments of the invention and that modifications may be made without departing from the spirit and scope of the invention as set forth in the following claims.

We claim:

1. A method of manufacturing a dual alloy turbine wheel comprising the steps of:
   providing a casting, a hub, and a spun metal form, said casting having a casting flange, said spun metal form having a form flange;
   assembling said casting, said hub, and said spun metal form such that an assembly with an interface is produced;
   applying a braze bead to said assembly such that said braze bead is in contact with said casting flange and said form flange;
   vacuum brazing said form flange to said casting flange; and
   hot isostatic pressing said assembly.

2. The method of claim 1, further comprising a step of inspecting said assembly prior to said step of hot isostatic pressing.

3. The method of claim 1, further comprising a step of passivating said spun metal form, said step of passivating is prior to said step of assembling.

4. The method of claim 1, further comprising a step of stamping said form flange such that said form flange is planar to within about 0.002 inches (0.005 cm).

5. The method of claim 1, wherein said spun metal form comprises a nickel-based super alloy.

6. The method of claim 1, wherein said casting has a casting chamfer, and further comprising a step of positioning said spun metal form on said casting chamfer.

7. The method of claim 1, wherein said hub has a hub chamfer, and further comprising a step of positioning said spun metal form on said hub chamfer.

8. The method of claim 1, further comprising a step of passivating said spun metal form, said step of passivating is within about eight hours prior to said step of assembling.

9. The method of claim 1, wherein, after the assembling step, said form flange extends about 0.090 inches (0.229 cm) away from said interface.

10. The method of claim 1, wherein the braze bead is applied at about 0.090 inches (0.229 cm) away from the interface of the assembly.

11. The method of claim 1, further comprising a step of stamping said form flange such that said form flange is planar such that said form flange is positioned flush with the casting flange.

12. The method of claim 1, wherein the diameter of the braze bead is from about 0.075 inches (0.1905 cm) to about 0.125 inches (0.3175 cm).

13. A method of protecting a bond at the interface between a casting and a hub comprising:
  placing over said hub and a portion of said casting a form can including a form flange and a form flange edge such that said form flange edge extends about 0.090 inches (0.229 cm) away from said interface; and
  brazing said conformal form to said casting.

14. The method of claim 13, wherein said form can conforms to the shape of said hub.

15. The method of claim 14, wherein said form can conforms to a shape of said portion of said casting.

16. The method of claim 13, further comprising a form gap between said form can and said casting.

17. The method of claim 13, wherein said interface has an interface edge, and a distance between said form flange edge and said interface edge is greater than the length of a straight line between said form flange edge and said interface edge.

18. The method of claim 17, wherein said distance between said form flange edge and said interface edge is measured between said form can and said casting through said form gap.

19. A dual alloy turbine wheel comprising:
  a hub;
  a casting bonded to said hub; and
  a form can, including a form flange and a form flange edge wherein said form can encloses said hub and extends about 0.090 inches (0.229 cm) over said casting, wherein said form can is brazed to said casting.

20. The dual alloy turbine wheel of claim 19, wherein said dual alloy turbine wheel has an interface and an interface edge.

21. The dual alloy turbine wheel of claim 20, further comprising a form gap between said form can and said casting.

22. The dual alloy turbine wheel of claim 21, wherein a distance between said interface edge and said form flange edge, measured through said form gap, is greater than a length of a straight line between said form flange edge and said interface edge.

23. The dual alloy turbine wheel of claim 19, wherein said form can is integral to said form flange.

24. The dual alloy turbine wheel of claim 19, wherein said form flange is annular.

25. The dual alloy turbine wheel of claim 19, wherein said casting includes a casting flange, and said form flange is in contact with, and parallel to, said casting flange.

26. A method of manufacturing a dual alloy turbine wheel comprising the steps of:
  assembling a casting, a hub, and a form can to provide an assembly having an interface;
  said casting having a casting flange, and said form can having a form flange;
  applying a braze bead to said assembly such that said braze bead is in contact with said casting flange and said form flange; and
  vacuum brazing said form flange to said casting flange.

27. The method of claim 26, further comprising a step of hot isostatic pressing said assembly.

28. The method of claim 26, further comprising a step of passivating said form can, wherein said step of passivating is performed prior to said step of assembling.

29. The method of claim 26, wherein, after said step of assembling, said form flange extends about 0.090 inches (0.229 cm) away from said interface.

30. The method of claim 26, wherein said braze bead is applied at about 0.090 inches (0.229 cm) away from said interface of said assembly.

31. A method of preventing contamination of a casting/hub interface comprising:
  covering said casting/hub interface with a form can, said form can including a form flange and a form flange edge; and
  brazing said form flange to a casting such that said form flange edge extends away from an interface edge of said casting/hub interface.

32. The method of claim 31, wherein said interface edge is the outer diameter of said casting/hub interface.

33. The method of claim 31, wherein a distance between said form flange edge and said interface edge is greater than the length of a straight line between said form flange edge and said interface edge.

34. The method of claim 33, wherein the brazing step comprises vacuum brazing.

* * * * *